United States Patent [19]

Caserta et al.

[11] Patent Number: 4,465,333
[45] Date of Patent: Aug. 14, 1984

[54] ELECTRO-OPTICAL PLUG-IN INTERCONNECTION

[75] Inventors: Anthony L. Caserta, Huntington; Bruno Lijoi, Farmingdale, both of N.Y.

[73] Assignee: Grumman Aerospace Corporation, Bethpage, N.Y.

[21] Appl. No.: 339,688

[22] Filed: Jan. 15, 1982

[51] Int. Cl.³ .................... G02B 5/14; G02B 7/26
[52] U.S. Cl. ........................... 350/96.20; 350/96.21
[58] Field of Search ............... 350/96.15, 96.16, 96.22, 350/96.20, 96.21

[56] References Cited

U.S. PATENT DOCUMENTS

| | | | |
|---|---|---|---|
| 3,522,404 | 11/1967 | Trayer | 200/168 |
| 3,674,914 | 7/1972 | Burr | 174/68.5 |
| 3,676,689 | 7/1972 | Knepper | 250/219 |
| 3,777,154 | 12/1973 | Lindsey | 250/227 |
| 3,876,900 | 4/1975 | Amatsuka et al. | 313/510 |
| 3,879,606 | 4/1975 | Bean | 250/227 |
| 3,883,772 | 5/1975 | Wako et al. | 313/499 |
| 3,901,582 | 8/1975 | Milton | 350/96.16 |
| 3,963,920 | 6/1976 | Palmer | 250/239 |
| 4,057,719 | 11/1977 | Lewis | 250/227 |
| 4,081,208 | 3/1978 | Meade | 350/96.20 |
| 4,130,343 | 12/1978 | Miller et al. | 350/96.15 |
| 4,170,399 | 10/1979 | Hansen et al. | 350/96.20 |
| 4,217,030 | 8/1980 | Howarth | 350/96.21 |
| 4,285,571 | 8/1981 | Winzer | 350/96.21 |

Primary Examiner—David K. Moore
Assistant Examiner—Brian Healy
Attorney, Agent, or Firm—Richard G. Geib; Daniel J. Tick; John P. Kozma

[57] ABSTRACT

A plug-in interconnection for optical and avioptic cables for connecting those cables into equipment such as circuit boards having fiber optic circuitry running in a plane normal to the axis of the plug-in interconnection. In the interconnection, a male connector having the end of the optical fiber means of the cable projecting from the end thereof is plugged into an on-axis female receptacle. In the receptacle, an aperture normal to its axis receives either the end or light from the end of the optical fiber circuit means in the equipment being interconnected. Reflecting means in the bore of the female receptacle aligned with the axis of optical fiber means in the male plug-in connector, when plugged in, reflects light signals between the optical fiber means in the connector and the circuit means in the equipment. An embodiment in which the light signal reflecting means is in the male connector is also disclosed. The interconnection can incorporate electrical termination means such as to provide a combined optical and electrical plug-in connector.

8 Claims, 5 Drawing Figures

ELECTRO-OPTICAL PLUG-IN INTERCONNECTION

BACKGROUND OF THE INVENTION

1. Field of the Invention

This invention relates to fiber optics and, in particular, to an interconnection for connecting a fiber optic cable to fiber optic circuitry running parallel to the surface of circuit boards and other equipment.

2. Description of the Prior Art

The recent development and adaptation of fiber optic technology to communications, data processing, and similar transmission systems result in numerous advantages as compared with electrical and electronic systems which have comparable functional objectives. Low-loss, high quality, multimode fiber optic cable has been developed which makes practical optical systems both feasible and desirable. Some of the advantages of fiber optic cables used in such systems include greatly reduced size, weight, and cost; electrical isolation which eliminates grounding and ground loops; and, easy coupling to common logic circuitry by use of available light sources and detectors. Moreover, fiber optic cables permit high channel isolation, easy interchangeability with electrical cable, and greatly reduced electromagnetic interference.

In military use, one of the most important advantages offered by fiber optic cables is their characteristic immunity to radio frequency signals and the fact that the transmitted light signals are contained wholly within the cable. This obviously greatly increases transmission security, particularly for ground communications systems. The use of optical cables also eliminates cross talk and inductive coupling, and the optical paths provided by fiber optic cables are resistant to electromagnetic interference from other equipment. In addition, fiber optic systems are immune even to electromagnetic pulses, such as may be generated by nuclear explosions. A further important advantage of fiber optic systems is their inherently higher data rate capability.

When optical cable systems are used in aircraft, particularly of the smaller military types, they are exposed to and are required to operate in harsh environments, they have limited space for routing during installation, and they are subjected to considerable handling during their service life. Because fiber optic cable harnesses in general use do not differ visually from their electrical counterparts and will, therefore, receive the same rough treatment, the components of fiber optic cable systems, particularly the interconnections used therewith, must be as durable as electrical interconnects. There is a need, therefore, for a fiber optic cable interconnection that is as durable as an electrical connector and which is suitable for indiscriminate mixing with electrical interconnect systems. In additions, because of space limitations in electro-optical equipment that are now coming into use, there is a need also for fiber optic interconnections which can be connected into circuit components having fiber optic circuitry disposed normal to the axis of the connection itself.

Because of the requirement for precise alignment and to avoid damage to the connections, it has been a practice in the prior art to provide fiber optic terminations that are embedded or otherwise fixed on the circuit board or component to which the fiber optic is connected. Examples of such techniques are shown in the prior art by R. W. Lindsey, U.S. Pat. No. 3,777,154; J. P. Palmer, U.S. Pat. No. 3,963,920; and N. J. Hansen et al., U.S. Pat. No. 4,170,399.

A teaching of a plug-in connector for a fiber optic signal conduit combined with an electrical power conduit is disclosed in the prior art by R. A. Meade, U.S. Pat. No. 4,081,208. In Meade, however, instead of an interconnection for a circuit board having the circuitry embedded parallel to the surface as is the case in the present invention, an on-axis connection to an optical circuit component is taught. Disclosed in Meade is the straightin interfacing of the end of an optical signal conduit which plugs into a receptacle mounted on the face of the circuit board, the optic signal receiving apparatus being a part of the receptacle itself. There is no teaching in the prior art, therefore, of an optical fiber cable connector that plugs into a circuit board receptacle, the connector being furnished with means providing a signal path to an optical fiber that is routed parallel to the surface of the board.

SUMMARY OF THE INVENTION

This invention is an interconnection for optical and avioptic cables for connecting those cables into equipment such as circuit boards and "mother" boards. In electronic equipment, particularly in electronic systems used in the military, it is becoming a common design technique to mount electronic circuit components on cards or modules that are slipped in a side-by-side relationship into racks that are an integral part of the equipment. Each circuit card is provided with terminations on one edge thereof that plug into the mother board positioned in the back of the rack. The mother board has circuitry, usually of the "printed circuit" type, thereon for interconnecting the circuit boards plugged into it. Printed circuits are, of course, for electrical usage, but there have been investigations into the feasibility of using a similar pattern of light fibers on the mother board to permit optical communication between the various avioptic components on the circuit cards plugged into the mother board. ("Avioptic" is a acronym of the terms AVIonics and OPTIC; "avionics" being further understood to be an acronym designating the field of AVIation electrONICS.)

In this invention, the interconnection for optical fiber cables comprises a connector which is engaged in a receptacle in a mother board provided with optical circuitry. For convenience, the termination will be stated herein as being with a mother board; however, such reference to a mother board should be understood as implying no limitation thereto as it will be recognized that the invention can be used as an interconnection between other types of equipment and circuit elements. The connector comprises a cup-like body or plug containing a metal sleeve which encases the optical fiber cable such that the cable end is exposed. The mating receptacle comprises a cylindrical shell having its lower end embedded in the mother board. A hole in the receptacle shell wall receives the end of an optical fiber of the optical circuitry of the mother board. The end of the sleeve of the connector fits in the bore of the receptacle shell and the plug fits over the end of the receptacle shell protruding from the mother board. Beam deflection means in the receptacle or on the connector directs light between the fiber optic cable ad the optical circuit element of the mother board for transmission therethrough. Should the requirements dictate, electrical coupling means can be incorporated into the interconnection such that the termination can accommodate electrical as well as optical functions.

In view of the foregoing, it is thus the principal object of the invention to provide a plug-in type interconnection for coupling a fiber optic cable into a mother board or similar avionic equipment having the optical circuit elements thereof arranged parallel to the surface of the board or equipment.

It is another object of the invention to provide a fiber optic cable interconnection that achieves right-angle beam deflection so that a maximum avionic packaging density is attained.

It is a further object of the invention to provide a fiber optic cable interconnection that can be rapidly and easily plugged in or removed without damage to the optic fibers of the cable.

A yet further object of the invention is to provide a fiber optic interconnection of the on-axis plug-in type such that the proper alignment of the optic elements being interconnected is automatically assured.

Yet another object of the invention is to provide a fiber optic cable interconnection in which electrical coupling means can be incorporated to permit a rapid and simultaneous plugging in and removal of a combined optical and electrical termination to thereby allow paralleling of the fiber optic circuit interconnection with conventionally used electrical circuits.

Still another object of the invention is to accomplish the foregoing objects in an inexpensive practical, safe, and reliable manner.

DESCRIPTION OF THE DRAWINGS

For the purpose of illustrating the invention, there is shown in the drawings the form which is presently preferred; it should be understood, however, that the invention is not necessarily limited to the precise arrangements and instrumentalities here shown.

FIGS. 2–5 are cross-sectional views of further embodiments of the fiber optic cable interconnection with a mother board.

DESCRIPTION OF THE PREFERRED EMBODIMENTS

Figure 1:
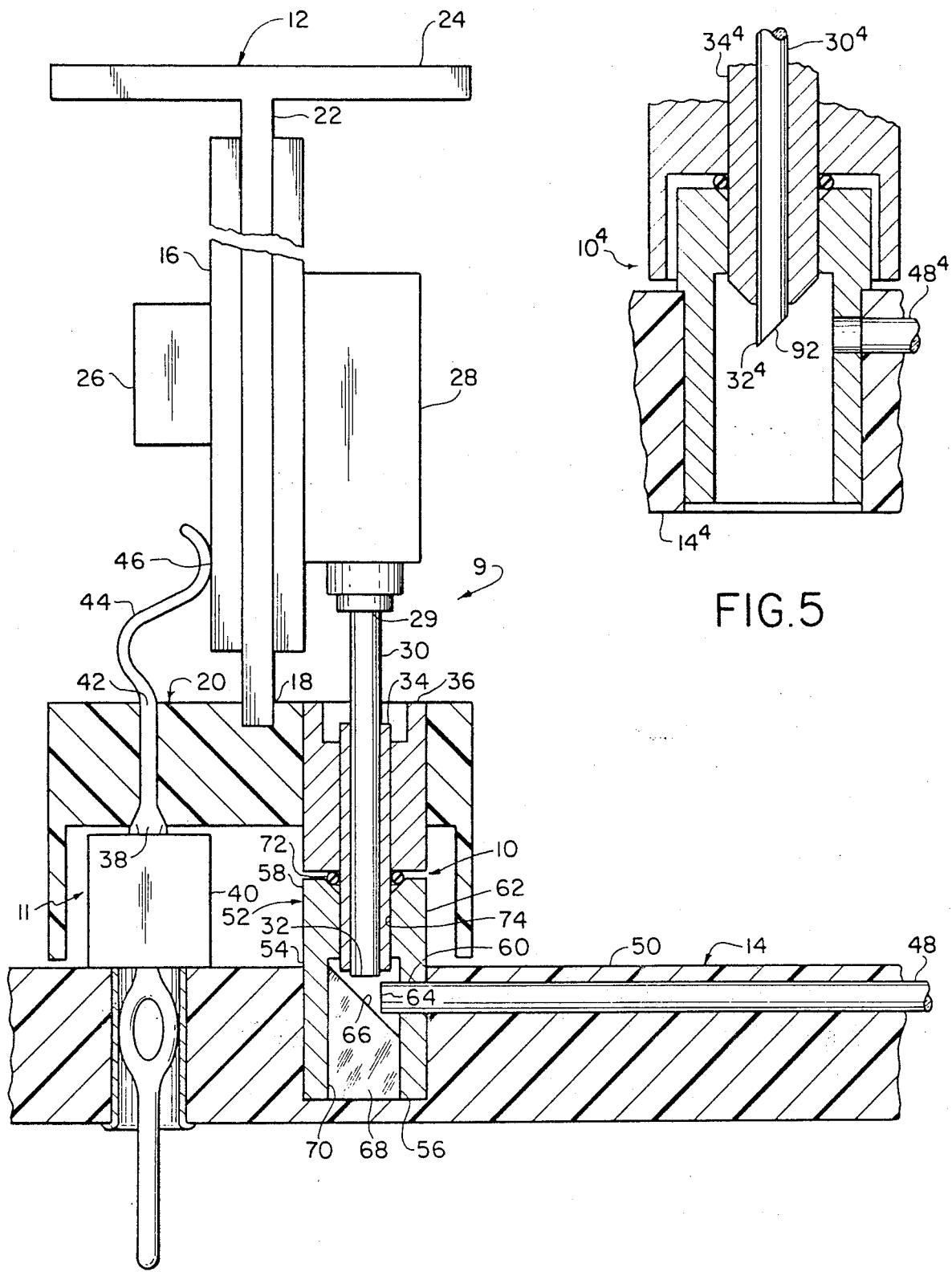
FIG. 1 is a view in partial cross-section of a preferred embodiment of the fiber optic cable interconnection of the invention optically coupling a circuit card into a mother board, the interconnection also incorporating an electrical termination.

Having now more particular reference to the drawings, FIG. 1 shows an interconnection 9 of the invention optically coupling a circuit board module or card 12 into a mother board 14. Interconnection 9 includes one or more fiber optic interconnections 10 along with electrical interconnection 11. Circuit card 12 can be a plug-in printed circuit board of any well known type such as the ISEM-2A (Improved Standard Electronic Module 2A) used by the U.S. Military. The circuit card 12 has a planar component mounting body 16, having one edge portion 18 provided with a terminal strip 20 and the other edge portion 22 with the module "T" frame 24. Electronic components such as chip carriers or integrated circuit modules 26 are mounted on the planar body 16, printed circuitry (not shown) providing the necessary electrical interconnections between the modules 26 and the terminals in the terminal strip 20. Also mounted on planar body 16 are one or mor electro-optical transducers 28. To avoid burdening the drawing with what is believed to be unnecessary detail, only one circuit module 26 and one electro-optical transducer 28 are shown mounted on the card body. It will be appreciated, of course, that any suitable number of those components and a full range and number of other electronic components can be mounted on the card as is the conventional practice. An optical signal path into and out of the electro-optical transducer 28 is provided by fiber optic means 30, one end 29 of which is suitably connected into the transducer. The fiber optic means 30 can comprise a single optical fiber as shown in the drawings or a "bundle" or a multiplicity of optical fibers can be used. The other end 32 of the optical fiber 30 preferably is encased with its tip protruding in a cylindrical sleeve 34 which in turn is suitable fastened with its end protruding in a coaxial cylindrical plug 36. Sleeve 34 generally is not required when large diameter fibers ae used. Plug 36 is appropriately affixed in terminal strip 20 of the circuit card 12. As is known, the terminal strip 20 can be provided also with a plurality of electrical terminations, only one, 11, of which is shown, for the printed circuitry running to the electronic and electro-optical components mounted on the circuit card. Each electrical termination has a male pin or contact 38 which is received in the female receptacle 40 of the termination in accordance with conventional practice. An electrical conductor 42 which passes through the body of the terminal strip provides a current path between the pin 38 and a resilient contact strip 44, the end portion 46 of which contacts an appropriate area of the printed circuitry on the circuit card to thereby supply electrical continuity between the circuit card 12 and the mother board 14.

The mother board is provided with the requisite printed circuitry and the like to provide electrical continuity between the circuit cards associated therewith in the card rack of the electronic equipment in which it is installed and also to power and signal sources external to the card rack. Female receptacle 40 of the electrical termination 11 thus is suitably connected by well known means into the electrical circuitry of the mother board. In this embodiment of the invention, the mother board also is supplied with fiber optic circuitry, one optical fiber 48 of which is shown. Optical fiber 48 can be fastened to the surface 50 of the mother board or, preferably it can be embedded therein as shown for protection. The optical path 48 can also be created by a variation in the index of refraction of selected areas in the mother board material.

The receptacle 52 in the mother board for the fiber optic interconnection comprises a cylindrical sleeve 54 whose one end 56 is embedded in the surface 50 of the mother board such that the other end 58 protrudes therefrom. An aperture 60 in the wall 62 of the sleeve 54 receives one end 64 of the optical fiber path 48, the other end thereof being routed to optical or electro-optical equipment mounted on the mother board. The end 64 of the optical fiber is aligned with the reflecting surface 66 of a reflector 68 positioned in the lower bore 70 of sleeve 54. Reflecting surface 66 is aligned at 45 degrees to the axis of the sleeve such that light directed along the axis of the sleeve is reflected into the end of the optical fiber and light from the optical fiber is reflected along the axis of the sleeve. It will be recognized that the reflecting surface 66 and the ends 32 and 64 of optical fibers 30 and 48 respectively are treated or worked as required to enhance their optical properties. An O-ring 72 can be provided on sleeve 34 to seal the interconnection against contamination and moisture.

In operation, the circuit card 12 is positioned in the circuit card rack of the electronic equipment with the electrical pin 38 aligned with the female receptacle 40 and optical fiber plug 36 aligned with the upper bore 74 of receptacle 52 in the mother board 14. Connection is made by plugging in the circuit card such that pin 38 is seated in receptacle 40 and the sleeve 34 encasing optical fiber 30 is seated in receptacle 52. When the connection 9 is made, electrical termination 11 provides electrical continuity between the circuit card and the mother board, and the optical interconnection 10 provides an optical signal path between electro-optical components of the circuit card and the fiber optic circuitry of the mother board. It will be apparent that the circuit card is unplugged by reversing the plug-in procedure.

Figure 2:
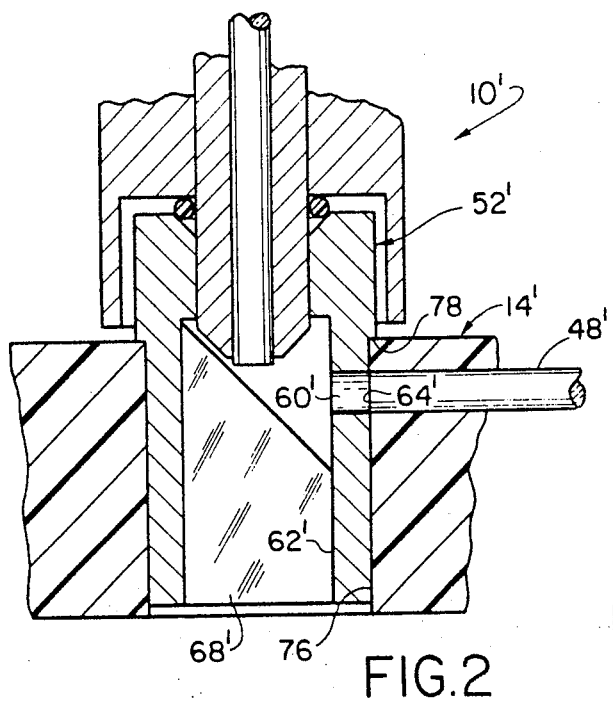

In the embodiment of the invention shown in FIG. 1, the end 56 of the female receptacle 52 of the optical interconnection 10 is embedded in the mother board 14. However, for manufacturing and other considerations, it may be preferable to utilize the construction illustrated in FIG. 2. In the FIG. 2 embodiment, a hole 76 of the required diameter to receive receptacle $52^1$ is drilled through or otherwise formed in mother board $14^1$ and the receptacle is inserted therein. The end $64^1$ of optical fiber $48^1$ in the mother board is terminated at the wall of hole 76 in the mother board and the aperture $60^1$ in the wall $62^1$ of receptacle $52^1$ is aligned therewith. A reflector $68^1$ is provided in the bore of the receptacle which may also be furnished with a shoulder 78 and other indexing means (not shown) to ensure the proper alignment of the reflector with the end of the optical fiber. In all other respects the construction and operation of the interconnection $10^1$ is identical with interconnection 10 of FIG. 1. It will be understood, of course, that the plug-in optical interconnection 10 of the invention can be used individually without an associated electrical termination should the requirements to dictate and that this also applies to the other embodiments set forth herein.

Figure 3:
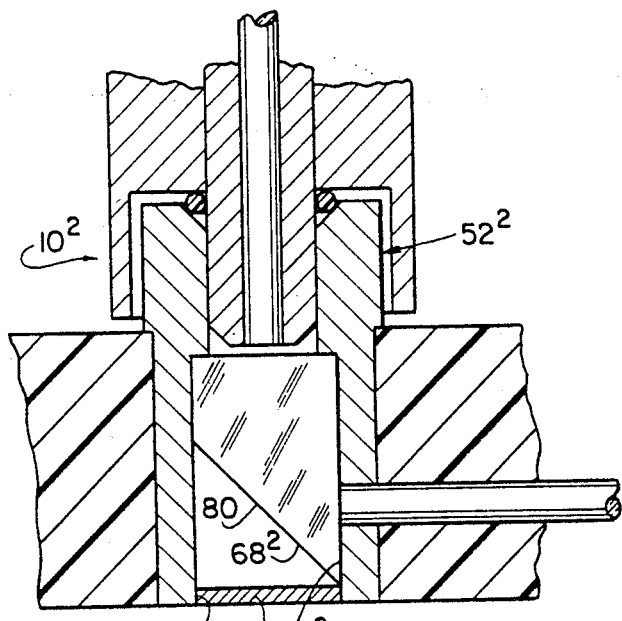

A further embodiment of the invention is illustrated in FIG. 3. In all essential respects the plug-in optical interconnection $10^2$ of FIG. 3 is identical with interconnection $10^1$ of FIG. 2 except that the reflector $68^2$ in the receptacle $52^2$ is a prism having a silvered or specular face 80 positioned to reflect light signals in accordance with the teachings of the invention. An end wall or disk 82 can be suitably fixed in the end 84 of the lower bore $70^2$ of the receptacle $52^2$ to seal the reflector in place and to protect it from contamination or damage.

Figure 4:
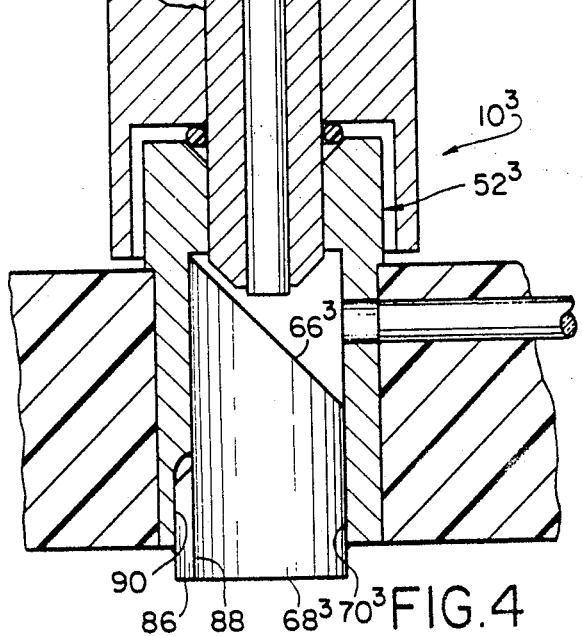

Yet another embodiment of the invention is shown in FIG. 4. The plug-in optical interconnection $10^3$ of this embodiment is essentially identical to interconnection $10^1$ of FIG. 2 with the exception that, to ease manufacturing and assembly operations, the reflector $68^3$ is a removable insertable element. Thus, the reflector can be a metal pin having a reflecting surface $66^3$ which is polished or specularly finished as by vapor deposition. A key 86 projecting from the wall 88 of the reflector engages a keyway 90 cut into the lower bore $70^3$ of the receptacle $52^3$ to ensure that the reflector is properly positioned in the receptacle in accordance with the teachings of the invention. Any suitable known fastening means (not shown) can be utilized to secure the reflector in the receptacle.

In the exposition of the invention to this point, the means in the plug-in interconnection for reflecting the light signals have been located in the female receptacle mounted on the mother board. It will be appreciated that the light signals can also be reflected by reflecting means in the male member of the interconnection. As shown in the interconnection $10^4$ embodied in FIG. 5, the end $32^4$ of the optical fiber $30^4$ projecting from the sleeve $34^4$ can be bevelled to form a reflecting surface 92 such that light signals can be reflected between fiber $30^4$ in the male plug and optical fiber $48^4$ in the mother board $14^4$.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

Having thus described our invention, what we claim is:

1. A plug-in interconnection for optically coupling fiber optic cable means to avioptic circuit devices, said interconnection comprising a male optical connector encasing the terminal portion of said cable means, said cable means having an end exposed such that light passes therethrough;

a female optical receptacle mounted on said circuit device for receiving said male optical connector in an on-axis, coaxial relationship, said receptacle having a bore on the longitudinal axis of said interconnection and a wall with an aperture formed through said wall, said aperture having an axis normal to the axis of said bore, said aperture axis being aligned with the axis of at least the end portion of an optical element of a circuit device;

reflecting means in said bore of said receptacle, said reflecting means having a reflecting surface in operative alignment with said axis of said optical element such as to reflect light between said cable means in said connector and said optical element of said circuit device whereby light signals can be communicated therebetween;

a male electrical termination element associated with said male optical connector; and an electrical termination receptacle associated with said female optical receptacle with the axes of said electrical termination element and said interconnection have a parallel relationship such that there is a simultaneous coupling of both said electrical and optical elements thereof when said interconnection is plugged in.

2. The plug-in interconnection defined in claim 1, wherein said reflecting means is fixed in the bore of said female optical receptacle.

3. The plug-in interconnection defined in claim 1, wherein said reflecting means consists of a bevel in the end of said cable means of said male optical connector.

4. The plug-in interconnection defined in claim 2, wherein said reflecting surface of said reflecting means is disposed at a 45-degree angle relative to the longitudinal axis of said interconnection.

5. The plug-in interconnection defined in claim 2, wherein said reflecting means consists of a prism having one face which has a specular finish that is used as a reflecting surface.

6. The plug-in interconnection defined in claim 2, wherein said reflecting means consists of a body inserted in the bore of said female optical receptacle, said body having a reflecting end with a reflecting surface, and means for retaining said body in said bore with said reflecting surface operatively aligned with the aperture in the wall of said female optical receptacle.

7. The plug-in interconnection defined in claim 6, wherein said body of said reflecting means has alignment means associated with means in the bore of said female optical receptacle for operatively aligning said reflecting surface of said body with the aperture in the wall of said female optical receptacle.

8. The plug-in interconnection defined in claim 7, wherein said alignment means of said body of said reflecting means consists of a key associated with a keyway in the bore of said female optical receptacle.

* * * * *